United States Patent [19]

Kato et al.

[11] 4,192,649

[45] Mar. 11, 1980

[54] PROCESS OF SIZING, WEAVING, DESIZING AND WASTE WATER TREATMENT

[75] Inventors: Hiroshi Kato, Nishinomiya; Yoshiaki Ito; Hiroshi Tokonami, both of Itami; Atsuo Sawada, Hirakata, all of Japan

[73] Assignee: Nippon Gohsei Kagaku Kogyo Kabushiki Kaisha, Osaka, Japan

[21] Appl. No.: 874,349

[22] Filed: Feb. 1, 1978

[30] Foreign Application Priority Data

Feb. 1, 1977 [JP] Japan ................................. 52-10383

[51] Int. Cl.$^2$ .......................... D01C 3/02; B01D 5/00
[52] U.S. Cl. .......................................... 8/138; 8/141; 210/42 R
[58] Field of Search .................. 8/138, 141; 210/42 R

[56] References Cited

U.S. PATENT DOCUMENTS

| | | | |
|---|---|---|---|
| 2,242,139 | 5/1941 | Munroe | 210/44 |
| 3,418,236 | 12/1968 | Mail | 210/44 |
| 3,829,291 | 8/1974 | Kravetz | 8/138 |
| 4,092,105 | 5/1978 | Sullins | 8/81 |

FOREIGN PATENT DOCUMENTS

51-60796 5/1976 Japan.

*Primary Examiner*—A. Lionel Clingman
*Attorney, Agent, or Firm*—Armstrong, Nikaido, Marmelstein & Kubovcik

[57] ABSTRACT

A process comprising the steps of (1) sizing a warp with an aqueous solution containing a partially hydrolyzed polyvinyl acetate, having a degree of hydrolysis of 50% to 80% by mole and an average degree of polymerization of not less than 400, and an anionic surface active agent capable of solubilizing the hydrolyzed polyvinyl acetate in water or capable of raising the cloud point of the hydrolyzed polyvinyl acetate, and then weaving, (2) subjecting the woven cloth to desizing in a scouring bath, and washing the cloth, and then (3) treating the desizing and washing waste water with an agent selected from polyvalent metal salt chelate-forming agents, strong acids and cationic compounds by adding the agent to the waste water to deposit the hydrolyzed polyvinyl acetate, and separating the deposited hydrolyzed polyvinyl acetate. The sizing work efficiency is good, the weaving efficiency is high, the desizing is smooth, and the waste water treatment is easy.

10 Claims, No Drawings

PROCESS OF SIZING, WEAVING, DESIZING AND WASTE WATER TREATMENT

BACKGROUND OF THE INVENTION

The present invention relates to a series of steps extending from the sizing of yarns to the treatment of waste water from the scouring, and more particularly to a process of sizing a warp in good work efficiency, weaving into cloth in high efficiency, smoothly desizing and treating waste water from sizing and washing steps with ease.

Polyvinyl alcohol having a degree of hydrolysis of about 88% by mole or more is employed as a warp sizing agent, since it is soluble in water and has good film-forming property and also the desizing can be made by a hot water. However, since such a polyvinyl alcohol extremely lacks in adhesion to hydrophobic fibers, it is usually employed in combination with acrylic resins, when used as a sizing agent for hydrophobic fibers such as polyester filament. The thus formulated sizing agent is also insufficient and has the defects that the binding property is poor, and that size shedding on loom is not disregarded, and particularly that size shedding accumulated in reed dents absorbs moisture and shows the gum up tendency.

On the other hand, it is reported in Japanese patent unexamined early publication No. 60796/1976 that when polyvinyl alcohol of which the degree of hydrolysis is not more than 85% by mole, particularly 79% to 80% by mole and the cloud point of the aqueous solution is not more than 40° C. is employed as a sizing agent, it can be deposited by merely heating the desizing waste water to more than 40° C. and 35% to 45% by weight of the employed polyvinyl alcohol can be recovered. Such a polyvinyl alcohol is soluble in cold water, but deposits under the temperature on preparing the sizing liquid or on sizing. Therefore, it is impossible to conduct uniform sizing and in its turn this exerts a bad influence upon size shedding and weaving.

OBJECTS OF THE INVENTION

It is an object of the present invention to provide a process of sizing, weaving, desizing and waste water treatment.

A further object of the invention is to provide a series of steps extending from sizing a warp with a specific composition to treating the waste water from the scouring with ease.

These and other objects of the invention will become apparent from the description hereinafter.

DETAILED DESCRIPTION

As a result of continual investigation with respect to the application of a low-hydrolyzed polyvinyl alcohol having a degree of hydrolysis of less than about 83% by mole to the sizing of hydrophobic fibers, the present inventors have found that polyvinyl alcohol having a degree of hydrolysis of 50% to 80% by mole is not employed singly as a sizing agent, because of being low in the cloud point or being insoluble in water, but when such a low-hydrolyzed polyvinyl alcohol is employed in combination with an anionic surface active agent such as alkylsulfates, alkyl sulfonates, alkylbenzenesulfonates, dialkyl sulfosuccinates and fatty acid alkali metal salts, it can be satisfactorily employed as a sizing agent for fibers, because the cloud point can be raised and the polymer is dissolved even under the temperature on preparing the sizing liquid or on sizing. Such a low-hydrolyzed polyvinyl alcohol exhibits the excellent properties in point of the adhesion strength to hydrophobic fibers, size shedding and weaving, as compared with a high-hydrolyzed polyvinyl alcohol.

The present inventors have further found that after the warp sizing is conducted by employing such a low-hydrolyzed polyvinyl alcohol in combination with the anionic surface active agent, the polyvinyl alcohol present in waste water from desizing and washing can be immediately deposited and coagulated in a short time by adding a polyvalent metal salt chelate-forming agent, a strong acid or a cationic compound to the waste water. According to the present invention, the coagulated precipitate can be readily separated and recovered in high yields.

The present invention provides a process of sizing, weaving, desizing and waste water treatment which comprises the steps of (1) sizing a warp by employing a sizing liquid containing a low-hydrolyzed polyvinyl alcohol having a degree of hydrolysis of 50% to 80% by mole and an average degree of polymerization of not less than 400 and an anionic surface active agent capable of solubilizing the polyvinyl alcohol in water or capable of raising the cloud point of the polyvinyl alcohol, and then weaving, (2) subjecting the woven cloth to desizing in a scouring bath, and washing the cloth, and (3) treating the desizing and washing waste water with an agent selected from polyvalent metal salt chelate-forming agents, strong acids and cationic compounds by adding the agent to the waste water to deposit the polyvinyl alcohol, and separating the deposited polyvinyl alcohol.

Low-hydrolyzed polyvinyl alcohols having a degree of hydrolysis of 50% to 80% by mole are employed in the present invention. When the degree of hydrolysis is less than 50% by mole, strength of the size film on the sized yarn lowers, since the amount of the anionic surface active agent employed to solubilize the polyvinyl alcohol must be increased. Also, when the degree of hydrolysis is more than 80% by mole, the adhesion to hydrophobic fibers is insufficient and the binding property and the abrasion resistance are impaired and also the size shedding increases. In the present invention, polyvinyl alcohols having a degree of hydrolysis of 55% to 78% by mole are preferred. Also, the polyvinyl alcohols employed in the present invention are those having an average degree of polymerization of not less than 400. The polyvinyl alcohols having an average degree of polymerization of less than 400 lack in the adhesion strength and binding property.

Polyvinyl alcohols having a degree of hydrolysis and an average degree of polymerization outside the above ranges may be employed in a small quantity as an assistant.

The anionic surface active agents employed in combination with the low-hydrolyzed polyvinyl alcohols are those capable of solubilizing the polyvinyl alcohols in water or capable of raising the cloud point of the polyvinyl alcohols. The anionic surface active agents belonging to the following groups are suitably employed in the present invention.

(1) Alkylsulfates such as sodium laurylsulfate and ammonium laurylsulfate
(2) Alkyl sulfonates such as sodium alkyl secondary sulfonates having alkyl groups of 12 to 18 carbon atoms (3) Alkylbenzenesulfonates such as sodium dodecylbenzenesulfonate
(4) Dialkyl sulfosuccinates such as sodium dioctyl sulfosuccinate
(5) Fatty acid alkali metal salts such as sodium oleate, sodium soap of semi-hardened beef tallow, potassium oleate, potassium soap of semi-hardened beef tallow, potassium soap of castor oil, sodium stearate and potassium stearate Among known anionic surface active agents, polyoxyethylene alkyl ether sulfates, polyoxyethylene alkylphenyl ether sulfates, alkyl phosphates and alkylnaphthalenesulfonates have little effect on raising the solubility of the polyvinyl alcohol, and higher fatty acid alkylolamide sulfates and higher fatty acid alkylolamide phosphates have an effect but insufficient in raising the solubility. Although the preferred anionic surface active agents are exemplified in the above groups (1) to (5), it is to be understood that any anionic surface active agents having an ability of solubilizing the polyvinyl alcohol in water or raising the cloud point of the polyvinyl alcohol can be employed without being limited to such exemplified surface active agents.

Non-ionic and cationic surface active agents have no effect of raising the solubility of the low-hydrolyzed polyvinyl alcohols.

It is necessary that both of the anionic surface active agent and the polyvinyl alcohol are present at the time of preparing a sizing liquid, and for instance, the sizing liquid is prepared by admixing the anionic surface active agent with the polyvinyl alcohol particles and dissolving the mixture in water, or by separately adding the surface active agent and the polyvinyl alcohol to water and dissolving them in water.

The amount of the anionic surface active agent to the low-hydrolyzed polyvinyl alcohol varies depending on the degree of hydrolysis and the average degree of polymerization of the polyvinyl alcohol, the concentration of the sizing liquid, the kind of the raw yarn and the kind of the anionic surface active agent, and in general, the lower the degree of hydrolysis or the higher the degree of polymerization, the larger amount of the anionic surface active agent is required. In many cases, the anionic surface active agent is employed usually in an amount of 0.1% to 30% by weight, particularly 0.5% to 15% by weight, based on the weight of the low-hydrolyzed polyvinyl alcohol. When the amount of the anionic surface active agent is too little, it becomes impossible to uniformly size a warp, and also when the amount is too large, strength of the size film on the sized yarn is decreased. Non-ionic surface active agents may be employed together with the anionic surface active agent, and often they show synergism.

In the preparation of the sizing liquid, known other sizing agents and known other additives such as oiling agents, assistants and anti-foaming agents may be, of course, employed.

The polymer content of the sizing liquid is usually adjusted to about 3% to about 11% by weight.

As a warp to be sized, any of filament yarns, textured yarns and spun yarns may be employed. The weaving is carried out in a usual manner.

After the weaving, the woven cloth is subjected to desizing. Although it is possible to conduct the desizing with only water, the desizing smoothly proceeds when a bath containing anionic surface active agents as mentioned before in an amount of less than about 20 g./liter is employed. If necessary, non-ionic surface active agents or alkaline substances may also be added to the bath. The desizing is conducted at a temperature of more than about 40° C. under heating, and after the desizing, the woven cloth is usually washed with water.

Waste water from desizing and washing contains the low-hydrolyzed polyvinyl alcohol and, therefore, it is necessary to remove the polyvinyl alcohol contained in the waste water prior to discharge to rivers and sea. The waste water treatment can be attained by the addition of an agent selected from polyvalent metal salt chelate-forming agents, strong acids and cationic compounds to the waste water. Since the polyvinyl alcohol dissolved in the waste water deposits and coagulates by the addition of these agents, the deposit can be separated from water with ease, for instance, by means of filtering, centrifuging or allowing to stand. In the waste water treatment, the separation efficiency is further raised, when the waste water is maintained at a temperature of not less than 40° C., preferably not less than 50° C.

Examples of the polyvalent metal salt chelate-forming agent employed in the present invention are aluminum sulfate, aluminum chloride, aluminum nitrate, aluminum acetate, potash alum, sodium alum, calcium chloride, magnesium chloride, ferric chloride, ferric sulfate and cupric sulfate. Examples of the strong acid employed in the present invention are hydrochloric acid and sulfuric acid. As the cationic compound, various cationic surface active agents and cationic resins are employed, as well as aliphatic amine salts, quaternary ammonium salts and alkylpyridinium salts.

The waste water treatment may also be carried out in such a manner as contacting the waste water with the agent insolubilized or supported on an carrier such as porous granular materials.

The separated polyvinyl alcohol may be thrown into the discard, but if necessary, may also be reused. For instance, in case of adding an acid to waste water containing the low-hydrolyzed polyvinyl alcohol and a fatty acid alkali metal salt, the polyvinyl alcohol is deposited, since the fatty acid alkali metal salt is converted into the fatty acid. At this time, the fatty acid is also deposited. After separating the mixture of the thus deposited polyvinyl alcohol and fatty acid, an alkali is added to the mixture. The fatty acid returns to the original alkali salt and the polyvinyl alcohol is dissolved in water again to form a uniform aqueous solution. The thus obtained aqueous solution may be reused for sizing of a warp.

The present invention is more specifically described and explained by means of the following Examples, in which all % are % by weight unless otherwise noted.

EXAMPLE 1

A sizing liquid having the following composition was prepared.

Sizing Liquid

Polyvinyl alcohol (degree of hydrolysis: 74% by mole, average degree of polymerization: 1,700: 8.0%
Sodium alkyl secondary sulfonate having 14 carbon atoms 0.3%
Sizing wax: 0.2%
Water: residue

[Sizing and Weaving]
By employing the above sizing liquid, a polyester/rayon blended yarn of 41/1 was sized, followed by after-waxing using a lubircant on a sizing machine. The sizing temperature and the size pick-up percent after drying were 65° to 70° C. and 11%, respectively.

The weaving was then conducted under the following conditions by employing the thus sized yarns and two looms to prepare a woven cloth of total 1,792 yards.

Texture: plain weave
Warp: total ends 5,165, density 136 ends/inch
Weft: same yarn as warp, density 72 picks/inch
Width of cloth: 37.8 inches
Loom: Automatic loom; 174 r.p.m.
Circumstance: 25° to 28° C.; 75% RH The results of the weaving are shown in Table 1.

[Desizing and Washing]

By employing a jigger, 1,240 yards of cloth was treated for 45 minutes in a scouring bath containing 3 g./liter of sodium alkyl secondary sulfonate having 14 carbon atoms at a bath temperature of 90° to 70° C. The cloth was then washed with a hot water of 60° to 40° C. and further with water of 18° C.

No residual polyvinyl alcohol was detected on the washed cloth. Total volume of the waste water was 3,000 liters and the concentration of solid matters dissolved in the waste water was 0.38%.

[Waste Water Treatment]

To the waste water maintained at a temperature of 55° to 60° C., 3 kg. of a 10% aqueous solution of aluminum sulfate was added and the waste water was agitated. Immediately mud-like white precipitates produced. The supernatant liquid was decanted and the residue was filtered through a clay plate. The obtained solid matter was dried and weighed, and the amount of the polyvinyl alcohol was calculated. Taking account of aluminum sulfate included in the solid matter, the removal percent of the polyvinyl alcohol was about 90%.

EXAMPLES 2 TO 5 AND COMPARATIVE EXAMPLES 1 TO 3

The sizing, weaving, desizing and washing procedures of Example 1 were repeated except that instead of 0.3% of the sodium alkyl secondary sulfonate in the sizing liquid, 0.3% of sodium laurylsulfate (Example 2), 0.3% of sodium dodecylbenzenesulfonate (Example 3), 0.3% of sodium dioctyl sulfosuccinate (Example 4) or 0.5% of sodium oleate (Example 5) was employed, and except that instead of the sodium alkyl secondary sulfonate added to the scouring bath, the same anionic surface active agent as that employed in the sizing was added to the scouring bath in each Example.

Also, the procedures of Example 1 were repeated except that the use of the sodium alkyl secondary sulfonate added to the sizing liquid was omitted (Comparative Example 1), except that the following sizing liquid commonly used for sizing a polyester/rayon blended yarn was employed instead of the sizing liquid used in Example 1 (Comparative Example 2), and except that a non-ionic surface active agent, polyoxyethylene lauryl ether was employed instead of the sodium alkyl secondary sulfonate in the sizing liquid (Comparative Example 3).

Sizing Liquid Used in Comparative Example 2

Polyvinyl alcohol (degree of hydrolysis: 88% by mole, average degree of polymerization: 1,700): 8.0%
Acrylic sizing agent: 0.3%
Sizing wax: 0.2%
Water: residue The results of the weaving are shown in Table 1 together with the results of the weaving in Example 1.

In Table 1, adhesion strength shows a value measured as follows: A sizing liquid was coated on a polyester film to form a film having a thickness of 100μ, and after conditioning at 20° C., 75% RH, the peeling strength was measured by a tensile testing machine. Also, the size shedding on loom was evaluated according to five classes of A, B, C, D and E in which A indicated "excellent" and E indicated "bad", and the warp shedding was evaluated with respect to whether the state of the shedding of warp on loom was good or bad, according to five classes of A, B, C, D and E in which A indicated "excellent" and E indicated "bad".

Table 1

|  | Adhesion strength g./cm.$^2$ | Size shedding on loom | Warp shedding | Warp stops per hour | Weaving efficiency % |
| --- | --- | --- | --- | --- | --- |
| Example 1 | 62 | A | A | 0.41 | 88 |
| Example 2 | 58 | A | A | 0.45 | 87 |
| Example 3 | 64 | A | A | 0.40 | 88 |
| Example 4 | 60 | A | A | 0.42 | 87 |
| Example 5 | 52 | A | B | 0.47 | 87 |
| Comparative Example 1 | 66 | * | — | — | — |
| Comparative Example 2 | 24 | B-C | B | 0.60 | 85 |
| Comparative Example 3 | 62 | * | — | — | — |

*Gum up took place in sizing box and the sizing and weaving were impossible.

As in apparent from Table 1, in Comparative Examples 1 and 3 in which the low-hydrolyzed polyvinyl alcohol is employed as a sizing agent, but not anionic surface active agent is employed, the sizing agent deposits at an elevated temperature and the sizing is impossible, though the adhesion strength of the sizing agent per se is high. However, according to the present invention using the low-hydrolyzed polyvinyl alcohol in combination with the anionic surface active agent, excellent effects are produced. Also, the commonly formulated sizing liquid in Comparative Example 2 is behind the sizing liquids formulated according to the present invention.

Further, the waste water treatment procedures of Example 1 were repeated.

In Examples 2 to 5, the removal percent of the polyvinyl alcohol was from about 85% to about 93%.

In Comparative Example 2 in which the sizing liquid containing polyvinyl alcohol having a degree of hydrolysis of 88% by mole and an acrylic sizing agent was employed, acrylic resin formed chelate by the addition of aluminum sulfate and deposited. However, not only the polyvinyl alcohol was not influenced by the addition of aluminum sulfate, but also retarded precipitation of the deposit by its emulsifying action. Therefore, it took a lot of time to precipitate the deposit and it was very difficult to treat waste water.

In case of the waste water of Comparative Examples 1 and 3 in which the sizing liquid containing the low-hydrolyzed polyvinyl alcohol but no anionic surface active agent was employed, in addition to the fact that gum up took place in a sizing box and the sizing and weaving were difficult as shown in Table 1, when the temperature of the waste water is elevated, the waste water merely became cloudy and the deposited polymer was hard to precipitate, and even if aluminum sulfate is added to the waste water at an elevated temperature, it took a long time to precipitate the deposit.

EXAMPLE 6

A sizing liquid having the following composition was prepared.

Sizing Liquid

Polyvinyl alcohol (degree of hydrolysis: 68% by mole, average degree of polymerization: 500): 7.5%
Sodium stearate: 0.6%
Water: residue

[Sizing and Weaving]

By employing the above sizing liquid, a polyester textured yarn of 75 deniers/36 filaments was sized by a warp sizing machine. The sizing temperature and the size pick-up percent were 50° C. and 9.5% to 10.0%, respectively.

The weaving was then conducted under the following conditions by employing the thus sized yarns.
Textile to be woven: satin
Warp: total ends 6,916
Weft: same yarn as warp, density 125 picks/inch
Loom: Automatic loom; 155-160 r.p.m.
Circumstance: 25° C.; 75% RH
Testing amount: 56 m.×40 pieces×2 looms=4,480 m.

The results of the weaving are shown in Table 2.

[Desizing and Washing]

By employing a rotary washer, the desizing of the woven cloth was carried out in a scouring bath containing 2 g./liter of sodium stearate at a bath temperature of 90° C. and then the relaxation was carried out. The cloth was then washed with a hot water of 40° to 50° C. and further with water of 18° C. Total volume of the wash water was 3,500 liters, and no residual polyvinyl alcohol was detected on the cloth by means of the iodine reaction.

Total volume of the waste water from the desizing and washing was 6,000 liters, and the concentration of solid matters was 0.53%.

[Waste Water Treatment]

To the waste water maintained at a temperature of 50° to 55° C., 19 liters of a 4% hydrochloric acid was added. The waste water was at pH 4. Immediately white precipitate of stearic acid including polyvinyl alcohol produced. Also oily floating matter, a part of which was considered to be derived from processing oil of raw yarn, was observed on the surface. After decanting a large portion of the supernatant liquid together with oily floating matter, the precipitate was filtered through a filter cloth with suction, while scraping the surface of the filter cloth. The thus obtained precipitate was 94 kg., and its solid content was 29.8%. The amount of the solid matter was 28 kg.

The obtained precipitate was sufficiently washed with a hot water of 50° to 60° C., and the composition of the solid matter was examined. The composition was as follows:
Polyvinyl alcohol: 77.5%
Stearic acid: 22.5%

Therefore, the removal percent of the polyvinyl alcohol was 93%.

[Reuse of Polyvinyl Alcohol]

Method A

To 1 kg. of the precipitate washed with a hot water of 50° to 60° C., calculated as solid matter, water was added to give an aqueous solution in concentration of about 10%. Then 350 g. of a 10% aqueous solution of sodium hydroxide was added to the above solution at a temperature of 75° C. to reproduce sodium stearate.

To the thus obtained aqueous solution containing polyvinyl alcohol and sodium stearate was added a dispersion of fresh polyvinyl alcohol having a degree of hydrolysis of 68% by mole and an average degree of polymerization of 500 in water to fall in the same composition as the sizing liquid. The mixture was then heated to dissolve polyvinyl alcohol. The thus prepared aqueous solution indicated approximately the same properties as those of the original sizing liquid, by which it was confirmed that the recovered polyvinyl alcohol could be reused.

Method B

The precipitate washed in the same manner as in Method A was added to methanol with agitation. The produced cotton-like precipitate was taken out and washed with a mixed solvent consisting of 40% of methanol and 60% of benzene to dissolve and remove foreign elements such as stearic acid.

The thus obtained polyvinyl alcohol has a purity of about 99%.

This polyvinyl alcohol may be sufficiently usable to other uses, as well as use in sizing a warp.

EXAMPLES 7 AND 8 AND COMPARATIVE EXAMPLES 4 TO 6

The sizing, weaving, desizing and washing procedures were carried out in the same manner as in Example 6 except that instead of 0.6% of sodium stearate in the sizing liquid, a mixture of 0.35% of sodium dioctyl sulfosuccinate and 0.25% of polyoxyethylene octylphenol ether (Example 7) or 0.35% of sodium laurylsulfate (Example 8) was employed.

Further, the procedures of Example 6 were repeated except that the use of sodium stearate added to the sizing liquid was omitted (Comparative Example 4), except that instead of the sizing liquid used in Example 6, the following sizing liquid which was typical polyvinyl alcohol-acrylic polymer sizing liquid for a polyester textured yarn was employed (Comparative Example 5), and except that a non-ionic surface active agent, polyoxyethylene lauryl ether was employed instead of sodium stearate in the sizing liquid (Comparative Example 6).

Sizing Liquid Used in Comparative Example 5

Polyvinyl alcohol (degree of hydrolysis: 88% by mole, an average degree of polymerization: 500): 3.8%

Sodium salt of copolymer of 50% ethyl acrylate, 35% methyl methacrylate, 10% methacrylic acid and 5% acrylic acid: 3.8%

Oiling agent: 0.4%

Silicone lubricant: 0.1%

Water: residue

The results of the weaving are shown in Table 2 together with the results of the weaving in Example 6.

In Table 2, tackiness was measured as follows: A sizing liquid was coated on a polyester film to form a film having a thickness of 100μ, and after placing a sheet of the film on top of the other and loading 1 kg./cm.$^2$ at 20° C., 75% RH and allowing to stand for 24 hours, the peeling strength was measured by a tensile testing machine.

Further, the waste water of Examples 7 and 8 was treated according to the procedure of Example 6. The similar results to Example 6 were obtained.

Also, the waste water of Comparative Example 5 was treated in the same manner as in Example. Only acrylic resin was insolubilized and polyvinyl alcohol could not removed.

What we claim is:

1. A process of sizing, weaving, desizing and waste water treatment which comprises the steps of
    (1) sizing a warp by employing a sizing liquid containing a low-hydrolyzed polyvinyl alcohol having a degree of hydrolysis of 50% to 80% by mole and an average degree of polymerization of not less than 400 and an anionic surface active agent capable of solubilizing said polyvinyl alcohol in water or capable of raising the cloud point of said polyvinyl alcohol, and then weaving,
    (2) subjecting the obtained woven cloth to desizing in a scouring bath, and washing the cloth, and
    (3) treating the resulting desizing and washing waste water with an agent selected from the group consisting of polyvalent metal salt chelate-forming agents, strong acids and cationic compounds by adding said agent to the waste water to deposit the polyvinyl alcohol, and separating the deposited polyvinyl alcohol.

Table 2

|  | Adhesion strength g./cm.$^2$ | Tackiness g./cm.$^2$ | Size shedding on loom | Gum-up tendency on loom | Weaving efficiency % |
|---|---|---|---|---|---|
| Example 6 | 52 | 35 | Little | None | 92 |
| Example 7 | 50 | 42 | Little | None | 93 |
| Example 8 | 52 | 36 | Little | None | 91 |
| Comparative Example 4 | 56 | 30 | * | — | — |
| Comparative Example 5 | 46 | 76 | A little | Gum-like matter adhered to reed dents | 89 |
| Comparative Example 6 | 52 | 34 | * | — | — |

*Gum up took place in sizing box and the sizing and weaving were impossible.

As is apparent from Table 2, the sizing liquid formulated according to the present invention has the advantages that the adhesion strength is large, even to a hydrophobic fiber such as polyester, that the tackiness is desirably low, that size shedding is scarcely seen and moreover size shedding accumulated in reed dents does not change to gum-like matter, and that the weaving efficiency is high.

In contrast to this, the sizing liquid of Comparative Example 5 according to the formulation widely used at the present time has the disadvantages that the adhesion strength somewhat lacks and moreover the tackiness is large and, therefore, size shedding accumulated in reed dents tends to change to gum-like matter by moisture absorption and lowers the quality of the textile, though size shedding is not so much.

In case of the sizing liquid of Comparative Examples 4 to 6 using the low-hydrolyzed polyvinyl alcohol as a sizing agent but no anionic surface active agent, the coating per se of the sizing liquid prepared by dissolution at a low temperature indicates good properties, but the polyvinyl alcohol deposits at a sizing temperature of 40° to 50° C. and satisfactory sizing cannot be made.

2. The process of claim 1 wherein said low-hydrolyzed polyvinyl alcohol has a degree of hydrolysis of 55% to 78% by mole.

3. The process of claim 1, wherein said anionic surface active agent is at least one member selected from the group consisting of alkylsulfates, alkyl sulfonates, alkylbenzenesulfonates, dialkyl sulfosuccinates and fatty acid alkali metal salts.

4. The process of claim 1, wherein said anionic surface active agent is employed in an amount of 0.1% to 30% by weight based on the weight of said low-hydrolyzed polyvinyl alcohol.

5. The process of claim 1, wherein said warp is a filament-spun yarn.

6. The process of claim 1, wherein said warp is a filament yarn.

7. The process of claim 1, wherein a scouring liquid in said scouring bath is water.

8. The process of claim 1, wherein a scouring liquid in said scouring bath is water containing not more than 20 g./liter of the anionic surface active agent.

9. The process of claim 1, wherein said waste water is maintained at a temperature of not less than 40° C.

10. The process of claim 1, wherein said waste water is maintained at a temperature of not less than 50° C.

* * * * *